(12) United States Patent
Johns

(10) Patent No.: US 11,778,068 B2
(45) Date of Patent: *Oct. 3, 2023

(54) SYSTEMS AND METHODS FOR PROCESSING REQUESTS FOR CONTENT OF A CONTENT DISTRIBUTION NETWORK

(71) Applicant: Level 3 Communications, LLC, Broomfield, CO (US)

(72) Inventor: Kevin C. Johns, Erie, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/087,510

(22) Filed: Dec. 22, 2022

(65) Prior Publication Data
US 2023/0128125 A1 Apr. 27, 2023

Related U.S. Application Data

(63) Continuation of application No. 17/712,657, filed on Apr. 4, 2022, now Pat. No. 11,546,447, which is a
(Continued)

(51) Int. Cl.
*H04L 67/60* (2022.01)
*G06F 16/22* (2019.01)
(Continued)

(52) U.S. Cl.
CPC .......... *H04L 67/60* (2022.05); *G06F 16/2282* (2019.01); *G06F 16/29* (2019.01);
(Continued)

(58) Field of Classification Search
CPC ..... H04L 67/60; H04L 61/4511; H04L 67/10; H04L 67/52; G06F 16/2282; G06F 16/29
See application file for complete search history.

(56) References Cited

U.S. PATENT DOCUMENTS 7,805,379 B1 * 9/2010 Adkins, III ............ G06Q 10/00 705/307
9,130,970 B2 * 9/2015 Carney ............... H04L 61/4511
(Continued)

FOREIGN PATENT DOCUMENTS

WO WO-2012097030 7/2012
WO WO-2012097030 A1 * 7/2012 ......... H04L 29/1265

OTHER PUBLICATIONS

International Preliminary Report on Patentability, dated Jun. 24, 2021, Int'l Appl. No. PCT/US19/065523, Int'l Filing Date Dec. 10, 2019; 9 pgs.
(Continued)

*Primary Examiner* — Austin J Moreau

(57) ABSTRACT

Improved methods for retrieval of content from CDNs is provided that includes a rendezvous controller that receives information of an identification of content being requested and an estimated location of a content requesting device. Based on this information, the rendezvous system identifies a server within a CDN from which the requested content may be retrieved. The selected server may be based on a repeatable hash function such that the likelihood that the content being requested is cached at the selected server. Steering requests to a server of the CDN which may have the content cached may reduce the number of servers within the CDN with the same cached content, particularly for the highest requested content. The rendezvous system may then return a corresponding domain name associated with the selected server and that can be subsequently submitted to a DNS for resolution to the IP address of the identified server.

18 Claims, 6 Drawing Sheets

Related U.S. Application Data continuation of application No. 16/709,726, filed on Dec. 10, 2019, now Pat. No. 11,303,723.

(60) Provisional application No. 62/778,122, filed on Dec. 11, 2018.

(51) Int. Cl.
    *G06F 16/29*     (2019.01)
    *H04L 67/10*     (2022.01)
    *H04L 61/4511*     (2022.01)
    *H04L 67/52*     (2022.01)

(52) U.S. Cl.
    CPC .......... *H04L 61/4511* (2022.05); *H04L 67/10* (2013.01); *H04L 67/52* (2022.05)

(56) References Cited

U.S. PATENT DOCUMENTS

| | | | |
|---|---|---|---|
| 2007/0050491 A1* | 3/2007 | Kataoka | H04L 67/563 709/223 |
| 2015/0288760 A1* | 10/2015 | Thomas | H04L 67/55 709/203 |
| 2017/0193125 A1 | 7/2017 | Weisman et al. | |
| 2020/0186613 A1 | 6/2020 | Johns | |
| 2022/0224769 A1 | 7/2022 | Johns | |

OTHER PUBLICATIONS

International Search Report and Written Opinion of the International Searching Authority, dated Mar. 4, 2020, Int'l Appl. No. PCT/US19/065523, Int'l Filing Date Dec. 10, 2019; 11 pgs.

* cited by examiner

SYSTEMS AND METHODS FOR PROCESSING REQUESTS FOR CONTENT OF A CONTENT DISTRIBUTION NETWORK

TECHNICAL FIELD

Embodiments of the present disclosure generally relate to systems and methods for implementing a content distribution network (CDN), and more specifically, to directing computing devices requesting content to servers of a content distribution network from which to obtain the content.

BACKGROUND

The Internet and the World Wide Web (the "Web") are ubiquitous and easily accessible using numerous possible wired or wireless computing devices. Content providers (publishers) now use the Internet (and, particularly, the Web) to provide all kinds of content to numerous users throughout the world through any number of platforms. In order to offload the job of serving some or all of its content, many content providers now operate or subscribe to content delivery networks (CDNs). Provider content can be served to clients from the CDN (e.g., from one or more content servers in the CDN) instead of from the content provider's server(s). In a caching CDN, content may also be locally cached for delivery by the CDN servers. Having content cached enhances the performance of the CDN because the content does not have to be retrieved from origin servers or other locations, which are less efficient than edge servers in providing content.

Numerous forms of content may be served from the CDN. For example, television shows and movies may now be accessed from any number of Web sites or through applications running on smart TVs, tablets, smart phones, etc., and the shows and movies may be served from the CDN. Print newspapers have migrated to the Web and provide portals through which clients operating some form of computing device (e.g., PC, smart phone, or tablet), with a browser may access numerous forms of content, such as short video clips, articles, images, and audio tracks. Software updates and patches, once provided on disc and mailed to recipients, are now routinely distributed to devices from a CDN through one or more network connections and devices.

In conventional CDN systems, a content management system (CMS) may receive a request for a particular piece of content from a user/client device. For example, a user may select a movie, television show, or software update from a list or interface provided by the CMS. In response, the CMS returns a domain name identifying a CDN from which the content may be retrieved. In this manner, the CMS may select from more than one CDN for providing the requested content to the client device. The client device, upon receiving the domain name for the selected CDN, then provides the domain name to a domain name system (DNS) resolver that subsequently submits the request to one or more DNS servers, including a name server of the DNS, that resolves the domain name to a corresponding Internet Protocol (IP) address. The IP address is then returned to the client device which initiates a session with the server associated with the returned IP address to retrieve the requested content.

Such conventional CDN systems have various inefficiencies related to the selection of servers from which content is to be provided. For example, if a content provider uses multiple CDNs, the content provider (or more specifically the CMS) is generally responsible for selecting from which CDN the content is to be provided. However, because the content provider is generally privy to only limited information regarding the performance and characteristics of the CDNs available to it, the content provider may select a non-optimal CDN to provide content. Similarly, the identification of a particular server or other content-providing device by the DNS may also be inefficient. For example, the name server may be configured to select from one of many available servers based on various performance criteria. In one example, the server may be selected based on lowest return trip time, which is generally a function of geographic proximity between the server and the client device. However, in conventional systems, the name server may have only limited information regarding the geographic location of the client device and/or the content that may be cached at the available servers. For example, the DNS may direct the client device to access a first server for the content that does not have the requested content cached while a second available server has cached the requested content. Without knowledge of the cached content at each server or the correct geographic location of the client device, inefficiencies in providing content to requesting devices may be introduced. Accordingly, to the extent the DNS resolver and client device may be more efficiently served by particular CDNs or particular components within a CDN, such efficiencies are foregone.

It is with these observations in mind, among others, that aspects of the present disclosure were conceived.

SUMMARY

One implementation of the present disclosure may take the form of a method for processing content requests. The method may include receiving, at a network computing device, a request for content from a content distribution network (CDN), the content request including each of a content identifier associated with a content file and a location identifier associated with a geographic location, identifying, based on the location identifier and the content identifier, a content server of the CDN for serving the content, the content server being geographically proximate to the geographic location, and transmitting, to a requesting device, a domain name comprising a server identifier corresponding to the identified content server, the domain name configured for resolving with a domain name system (DNS) resolver associated with the CDN to receive a network address of the content server.

Another implementation of the present disclosure may take the form of a system for orchestrating content from a content distribution network (CDN), the system comprising a rendezvous device. The rendezvous device may be caused to identify, based on a location identifier associated with a geographic location of a content requesting device and a content identifier associated with a content file included in a request for content, a content server of the CDN for serving the content to the content requesting device, the content server being geographically proximate to the geographic location and return, in response to the request for content, a domain name comprising a server identifier of the CDN corresponding to the identified content server, the domain name configured for resolving with a domain name system (DNS) resolver associated with the CDN to receive an access address of the content server.

Yet another implementation of the present disclosure may take the form of a networking device comprising one or more processors and a non-transitory storage device configured to store one or more programs. When the one or more programs are executed the one or more processors may identify, based on a location identifier associated with a geographic location of a content requesting device and a content identifier associated with a content file included in a request for content, a content server of the CDN for serving the content to the content requesting device, the content server being geographically proximate to the geographic location and return, in response to the request for content, a domain name comprising a server identifier of the CDN corresponding to the identified content server, the domain name configured for resolving with a domain name system (DNS) resolver associated with the CDN to receive an access address of the content server.

While multiple embodiments are disclosed, still other embodiments of the present disclosure will become apparent to those skilled in the art from the following detailed description, which shows and describes illustrative embodiments of the disclosure. As will be realized, the invention is capable of modifications in various aspects, all without departing from the spirit and scope of the present disclosure. Accordingly, the drawings and detailed description are to be regarded as illustrative in nature and not restrictive.

DETAILED DESCRIPTION

Figure 1A:
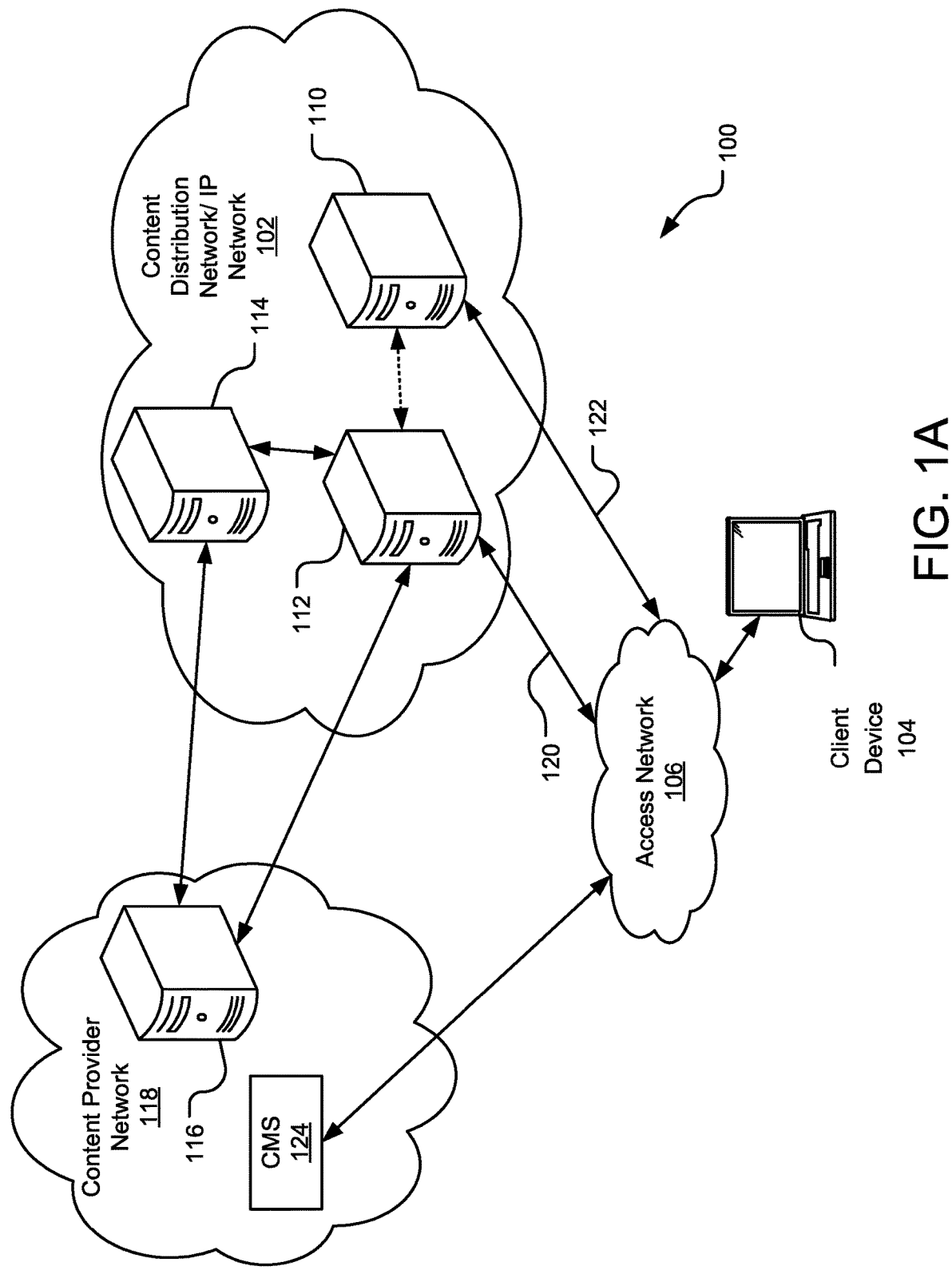
FIG. 1A is an example network environment for distributing content over a telecommunications network.

Implementations of the present disclosure are directed to systems and methods for improved retrieval of content from CDNs and, in particular, to content centric localization of retrieval of content from CDNs. A rendezvous controller or system may be provided that receives information regarding an identification of content being requested and an estimated location of a device requesting the content. The request information may be provided by the requesting device or may be provided from a third party system. The rendezvous system may utilize the provided information to identify a server within a CDN from which the requested content may be retrieved. In one implementation, the rendezvous system may use the content identifier and the estimated location as inputs to a a repeatable hash function, the output of which may provide an identification of the server in the CDN to provide the content. Further, because the hash function is repeatable, subsequent requests for the same content form the same location may direct the requesting device to the same selected server. The server may cache the requested content upon the first request such that the content may be available to additional requests for the content. As requests are directed to the same servers for the same content, the likelihood that the content being requested is cached at the selected server increases. Steering requests to a server that may have the content cached may reduce the number of servers within the CDN with the same cached content, which is particularly advantageous for the highest requested content that might otherwise be overly redundantly cached in numerous locations. The rendezvous system may then return a corresponding domain name associated with the selected server and that can be subsequently submitted to a DNS for resolution to the IP address of the identified server. The reduction in redundancy of cached content on the servers of the CDN may improve the efficiency and throughput of the CDN in providing the hosted content.

In one example implementation, the rendezvous system is in communication with a content management system (CMS) accessible by a client device. In response to receiving a request for content from the client device, the CMS transmits a request to the rendezvous system including an identifier corresponding to the requested content and a location identifier corresponding to an estimated location of the client device. In an alternative arrangement, the client device may submit a request for content to the CMS which then provides a content identifier and/or a location identifier to the client device. The client device may then submit the content and location identifiers to the rendezvous system to receive an identification of the selected server from which a requested content may be provided.

Although other implementations are possible, in one example implementation, the CMS performs a lookup on customer data to retrieve the location identifier. In another example implementation, the CMS may determine a location identifier by performing a geolocation operation on an IP address or similar information corresponding to the client device. The IP address corresponding to the client device may be received in the content request as a source IP address. In still another implementation, the location identifier may be the IP address of the client device and the rendezvous system may perform the geolocation operation. The CMS may determine, based on the content and/or location identifier, a CDN from which the requested content may be retrieved by the client device. The CMS may then provide the content and location identifier to the rendezvous system associated with the selected CDN. In response to receiving each of the content and location identifier, the rendezvous system identifies a server of the CDN from which the requested content may be retrieved. More specifically, the rendezvous system may execute a hashing function or other repeatable function to determine an available server based on the content and geographic identifiers. Further, because the hash function is repeatable, subsequent requests for the same content form the same location may direct the requesting device to the same selected server of the CDN. The selected server may cache the requested content upon the first request such that the content may be available to additional requests for the content, that may be similarly steered to the selected server. As requests are directed to the same servers for the same content, the likelihood that the content being requested is cached at the selected server increases. In some instances, more than one server may be available to provide the requested content for the geographic area of the client device and the hashing function may identify one of the available servers to serve the content.

The rendezvous system then returns a domain name to the client device (either directly or via the CMS) which may then submit the domain name to a domain name system (DNS) for resolution. For example, the client device may transmit the domain name to a DNS resolver that facilitates resolution of the domain name into an IP address corresponding to the identified server. Upon such resolution, the DNS resolver may return the IP address to the client device which, in turn, may initiate a session with the server and commence retrieval of the content.

In certain implementations of the present disclosure, content may be assigned to servers of the CDN using a consistent hash. As described below in further detail, such implementations enable the efficient distribution of content across servers of the CDN while improving the efficiency with which the CDN handles the addition and removal of servers from the CDN.

FIG. 1A is an example network environment 100 for distributing content to one or more users. Although illustrated in FIG. 1A as a content delivery network, it should be appreciated that aspects of the present disclosure may apply to any type of telecommunications network that utilizes network addressing (such as Internet Protocol (IP) addresses, media access control (MAC) addresses, domain names, etc.) for connecting an end user to one or more components of the network. For example, aspects of the disclosure may be utilized to connect a user of the network to a content server on which one or more content files is stored. Thus, although the CDN architecture is used throughout the document as the example network architecture through which aspects of the present disclosure may be applied; other network architectures and configurations are similarly contemplated.

In one implementation of the network environment 100, a CDN 102 is communicably coupled to one or more access networks 106. In general, the CDN 102 comprises one or more components configured to provide content to a user upon a request and an underlying IP network through which the request is received and the content is provided. The underlying IP network associated with the CDN servers may be any type IP-based communication network configured to transmit and receive communications through the network and may include any number and types of telecommunications components. In this manner, CDN-based components may be added to an existing IP-based communication network such that the components receive a request for content, retrieve the content from a storage device, and provide the content to the requesting device through the supporting IP network. For simplicity, the use of the term "CDN" throughout this disclosure refers to the combination of the one or more content servers and the underlying IP network for processing and transmitting communications, including one or more domain name architectures, unless otherwise noted.

In one embodiment, a client device 104 connects to the CDN 102 through one or more access networks 106 to request and receive content or content files from the CDN 102. The access network 106 may be under the control of or operated/maintained by one or more entities, such as, for example, one or more Internet Service Providers (ISPs) that provide access to the CDN 102. Thus, for example, the access network 106 may provide Internet access to a client device 104. In addition, the access network 106 may include several connections to the IP network of the CDN 102. For example, access network 106 includes access point 120 and access point 122. Also, the client device 104 may be connected to any number of access networks 106 such that access to the CDN 102 may occur through another access network. In general, access to a CDN 102 (or underlying IP network associated with the CDN) may occur through any number of ingress ports to the CDN through any number of access networks.

The CDN 102 is capable of providing content to a client device 104, which is generally any form of computing device, such as a personal computer, mobile device, tablet (e.g., iPad), or the like. Content may include, without limitation, videos, multimedia, images, audio files, text, documents, software, and other electronic resources. The client device 104 is configured to request, receive, process, and present content. In one implementation, the client device 104 includes an Internet browser application with which a link (e.g., a hyperlink) to a content item may be selected or otherwise entered, causing a request to be sent to a directory server 110 in the CDN 102. In another example, client device 104 may be a gaming console or smart television through which files, videos, images, and the like may be viewed.

Figure 1B:
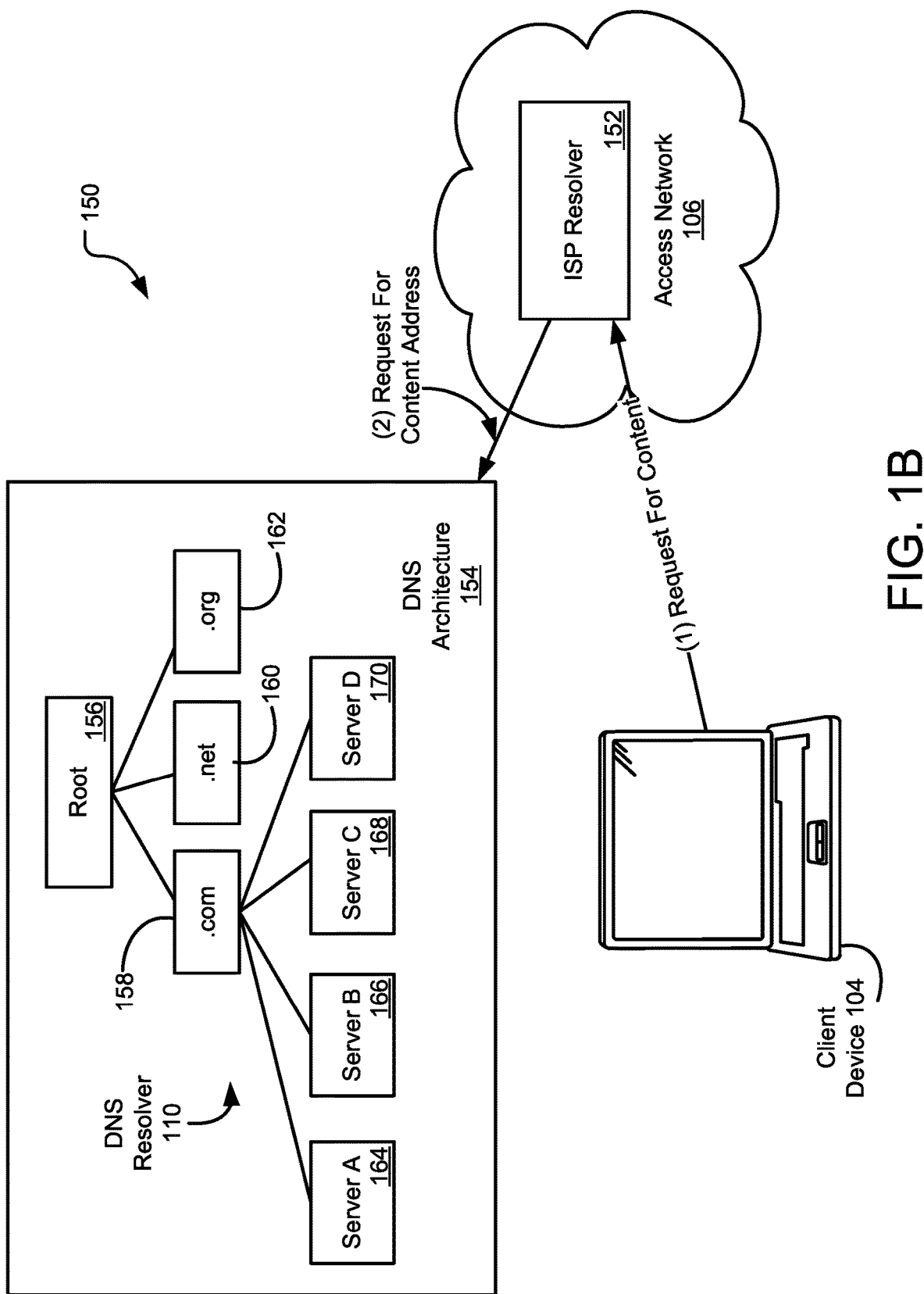
FIG. 1B is an example network environment of an authoritative domain name server (DNS) of a DNS architecture.

The CDN 102 may include a directory or authoritative server 110 that responds to the request by providing a network address (e.g., an IP address) where the content associated with the selected link can be obtained. In one implementation, the directory server 110 provides a domain name system (DNS) service, which resolves an alphanumeric domain name to an IP address. The directory server 110 resolves the link name (e.g., URL or other identifier) to an associated network address from which the client device 104 can retrieve the content. In some instances, the access network 106 may also include a DNS service. The directory server 110 may, in some instances, include several DNS servers arranged in a DNS architecture or system of servers to resolve domain names into IP addresses. For example, FIG. 1B is an example network environment 150 of an authoritative domain name server (DNS) of a DNS architecture 154. The components of the network 150 are similar or the same as components discussed above with reference to the network 100 of FIG. 1A. For example, the network environment 150 includes a user computing device 104, an access network 106 configured to provide access to a CDN for the computing device, and one or more DNS servers, discussed above.

As mentioned, the client device 104 may request content or a content file from the CDN 102. In one example, the client device 104 provides a link name (e.g., URL or other identifier) associated with content provided by the CDN 102. For example, client device 104 may provide a link name to a DNS resolver 152 associated with the access network 106. The DNS resolver 152 associated with the access network 106 is sometimes known as the ISP resolver. In one example, the access network ISP resolver 152 has cached an IP address for the provided URL at which the content available through that URL may be obtained. In other words, the ISP resolver 152 may return an IP address of a device (such as a content server or other content-providing device of the CDN 102) to the client device 104 to which the computing device may follow to access the content of the URL from the CDN.

However, while the ISP resolver 152 may be implemented to cache responses, the resolver often may not have a cached IP address for the provided domain name. In such cases, the DNS resolver 152 transmits a second DNS request to a DNS architecture 154 of the CDN 102 to receive an IP address at which the content file may be obtained. In general, the DNS architecture 154 provides a root node hierarchy of DNS resolvers that respond to DNS requests by either responding with the IP address associated with the provided domain name or directing the requesting device 152 through the architecture to the corresponding or proper DNS resolver within the architecture 154. Through the DNS architecture 154, the DNS request from the ISP resolver 152 is fulfilled (i.e., the IP address associated with the request is provided to the ISP resolver 152). In turn, the ISP resolver 152 may cache the returned IP address for future requests received at the resolver and may provide the IP address to the client device 104 in response to the DNS request.

More particularly, when the ISP resolver 152 does not have a cached IP address for the requested content, the ISP resolver 152 transmits a DNS request to a root node 156 or root server of the DNS architecture 154. The root node 156 may, in some instances, analyze the request and determine a type of URL included in the request. For example, the root node 156 may determine if the URL includes a ".com", ".net", ".org", etc. as a part of the entered URL. The DNS architecture 154 may include a DNS resolver for each of the different types of URLs, such as a DNS resolver 158 for .org URL requests, a DNS resolver 160 for .net URL requests, a DNS resolver 162 for .com URL requests, and so on. Upon determining the type of URL requested, the root node 156 may return to the ISP resolver 152 a redirect to a corresponding DNS resolver within the architecture 154.

The ISP resolver 152 may continue sending DNS requests to the DNS architecture 154, working down the hierarchy of the DNS architecture 154 servers, until the DNS 164-170 corresponding to the received URL is located. In this manner, the ISP resolver 152 is directed to, for example, DNS server B 166 within the architecture 154 for the particular URL and, once the IP address corresponding to the URL is obtained, the ISP resolver 152 may cache and/or provide the IP address to the client device 104. With this information, the computing device 104 accesses a device within the CDN 102 at the provided IP address and receives the requested content from the CDN 102.

Returning to FIG. 1A, the CDN 102 may include one or more edge servers 112, which may cache content from another server to make it available in a more geographically or logically proximate location to the client device 104. The edge server 112 may reduce network loads, optimize utilization of available capacity, lower delivery costs, and/or reduce content download time. The edge server 112 is configured to provide requested content to a requestor, which may be the client device 104 possibly via an intermediate device, for example, in the access network 106. In one implementation, the edge server 112 provides the requested content that is locally stored in cache. In another implementation, the edge server 112 retrieves the requested content from another source, such as a media access server (MAS) (e.g., a content distribution server 114 or a content origin server 116 of a content provider network 118). The content is then served to the client device 104 in response to the requests.

Client device 104 may also contact content management system (CMS) 124 of the content provider network 118 to receive further instructions or commands on accessing content from the CDN 102. For example, content provider network 118 may utilize more than one CDN for providing content to requesting devices. The selection of the CDN to provide content to the client device 104 may be based on any number and type of criteria, such as location of the client device 104, performance of the CDNs in the client device's location, a pricing structure for the content provider to use a CDN, constraints for the CDN established through a service provider agreement, and the like. Regardless of the business logic executed by the CMS 124, the CMS 124 may select a CDN from available CDNs to provide the requested content to the client device 104. In some instances, the client device 104 provides one or more identifiers to the CMS 124 for determining the CDN for the content. For example, the client device 104 may provide a geographic location indicator and an indicator of the requested content to the CMS 124. In other examples, the CMS 124 may determine or estimate the client device 104 location, such as by accessing an IP address associated with the access network 106 and estimating the client device 104 location from a database of IP addresses and estimated locations. The CMS 124 may also estimate the requested content by extracting or accessing a content file indicator in a URL, hostname, or other portion of the request for the content. Regardless of the business logic executed by the CMS 124 to select a CDN 102 for the client device 104, the CMS 124 may transmit an instruction or identification of the selected CDN 102 to the access network 106 or client device 104. The client device 104 or access network 106 may then redirect the request for content to the selected or identified CDN to request the content from the selected CDN. Additional operations of the CMS 124 are discussed in more detail below.

Once the CDN 102 is selected by the CMS 124, the client device 104 accesses the CDN to resolve the hostname or URL with the selected CDN 102 as described above. However, many DNS architectures 154 of CDNs 102 may have only limited information regarding the geographic location of the client device and/or the content that may be cached at the available content servers 112 of the CDN 102 such that the efficiency of the CDN 102 to cache content and direct requesting devices to the devices in which the content is cached is limited. For example, the DNS 154 may direct the client device 104 to access a first server 112 for the content that does not have the requested content cached while a second available server 110 has cached the requested content. Alternatively, popular content may be cached at multiple servers of the CDN 102, consuming memory space within those servers that may be used for other content.

Figure 2:
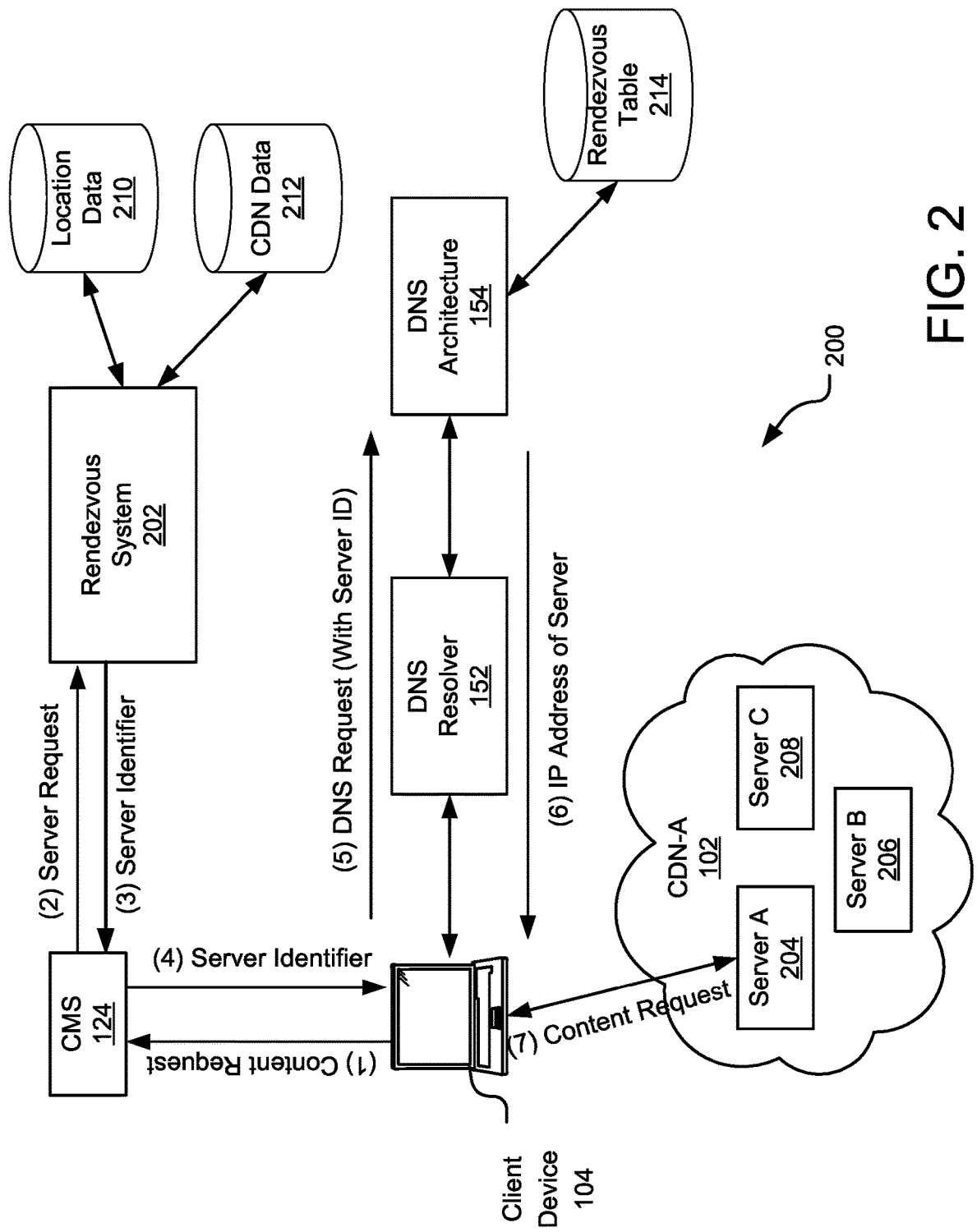
FIG. 2 is an example network environment including a rendezvous system for processing requests for content available through a content distribution network (CDN).

FIG. 2 is a block diagram of a network environment 200 for distributing content that utilizes a rendezvous system 202 for directing client devices 104 to connect to determined servers within the CDN 102 to provide content to the requesting device. Several components of the network environment 100 may be the same or similar to the components discussed above with reference to FIGS. 1A and 1B. For example, the environment 200 includes a client device 104, which may be any suitable computing device configurable to request and receive content from one or more content delivery networks (CDNs). For example and without limitation, the client device 104 may be one of a laptop computer, a desktop computer, a tablet, a smartphone, a video game console, or any other similar computing device. The environment 200 may also include a CMS 124 of a content provider network 118 for communicating with the client device 104 to select a CDN from multiple available CDNs for providing content to the client device 104, redirect the client device to contact the selected CDN 102 to transmit a DNS request, provide some content directly to the client device 104 (such as portals for accessing supported software or programs), and the like. A DNS resolver 152 and DNS architecture 154 is also included in the network environment 200 and operate as described above. CDN-A 102 is illustrated as the CDN selected by the CMS 124 for providing content to the client device 104 from multiple available CDNs.

In general, the CMS 124 may contact or otherwise communicate with the rendezvous system 202 to receive information on a particular content server or other content providing device of CDN-A 102 from which content may be provided to the client device 104. The communication with the rendezvous system 202 may occur in response to receiving a content request from the client device 104. For example and as illustrated in FIG. 2, the client device 104 may transmit a content request to the CMS 124 based on interactions of the client device 104 with the content provider network 118. In some instances, a user of the client device 104 may access a portal or program of the client device 104 that directs a content request to the CMS 124. The content request may include various information related to the client device 104 and/or the requested content. For example, the content request may include an IP address associated with the client device 104 or the access network 106 through which the client device 104 is communicating with the CMS 124. In another example, the content request may include a geographic location identifier of the client device 104. Further, the content request may include some identifier associated with the requested content, such as a file name, a path name, a number identifier, and the like. In general, any identifier utilized by the content provider network 118 for identifying or storing the content may be used and transmitted by the client device 104 in the content request.

The CMS 124, upon receiving the content request, may determine a CDN 102 from which the content is available to the client device 104. In one example, the CMS 124 may execute logic or other operations to determine the CDN 102. Such logic may consider the client device 104 location indicator and/or the content request indicator, as well as other business considerations discussed above. In some instances, the CMS 124 may select a CDN 102 that includes a corresponding rendezvous system 202. The rendezvous system 202 may aid the client device 104 is accessing a content server or other content-providing device of the selected CDN 102 to receive the requested content. In the example illustrated in FIG. 2, the CMS 124 may select, based on one or more business logic rules, to direct the client device 104 to CDN-A 102 from a plurality of available CDNs to provide the content. Rendezvous system 202 may be associated with CDN-A 102 and the CMS 124 may consult the rendezvous system 202 for directing the client device 104 to access a particular server (such as server A 204) of a plurality of available servers 204-208 of the CDN-A 102 to provide the requested content to the client device 104.

More particularly, CMS 124 may transmit a server request to the rendezvous system 202 associated with the selected CDN 102. The server request sent to the rendezvous system 202 may include information associated with the content request received at the CMS 124, such as an identification of the requested content (such as a content file name or other identifier) and/or an estimated geographic location of the client device 104. As described above, the location identifier may generally be any value corresponding to a geographic location or area. In certain implementations, the geographic location or area may generally correspond to a geographic location or area associated with the client device 104 and/or a user of the client device. Such information may include, without limitation, one or more of an address, a zip code, a county, a city, an airport code, one or more coordinates (e.g., longitude and latitude coordinates), or any other information that may describe a geographic location or region. In one example implementation, the location identifier may be an IP address or similar network address of the client device 104. In such implementations, the location of the client device 104 may be obtained using a geolocation algorithm or lookup that converts the IP address to a physical location suitable for identifying a geographically proximal (or similarly favored) CDN.

Although described primarily as corresponding to a location of the client device 104, it should be appreciated that the location identifier may correspond to any location. For example, instead of corresponding to a location of the client device 104, the location identifier may instead correspond to a proxy computing device, a location chosen by the CMS 124, or any other suitable location.

In response to receiving the request from the CMS 124, the rendezvous system 202 may determine one or more servers 204-208 of the CDN 102 from which the content may be accessed or provided to the client device 104. In certain implementations, identifying the servers may include determining which servers 202-208 of the CDN-A in the geographic location of the client device 104 may provide the requested content, either from cache or from the content provider network. For example, the rendezvous system 106 may access location data from a location database 210 that correlates location information in the form received from the CMS 124 to the CDN-A 102. The rendezvous system 202 may then perform a lookup in the location data 210 using the location information to determine geographically suitable servers 204-208 from which the content requested by the client device 104 may be retrieved. For purposes of the current example, it is assumed that the foregoing process results in the identification of servers 204-208 of CDN-A 102 as the most geographically suitable.

In addition, the rendezvous system 202 may further generate a server identifier for a specific server 204 within the identified CDN 102 area for providing the content. In the current example, CDN-A 102 includes multiple servers identified as SERVER-A to SERVER-C 204-208. However, any number of servers may be available for providing the content to the client device 104 from CDN-A 102. In certain implementations, the rendezvous system 202 may have access to CDN content data 212 for the content available via CDN-A 102 associated with the rendezvous system 202. The CDN content data 212 may include, for each piece of content, information for identifying those servers 204-208 in the area of the client device 104 from which the content may be requested or provided. In addition, the rendezvous system 202 may select, from the group of available servers 204-208, a particular server 204 to provide the content to the client device 104. For example, the CDN content data 212 may include a list of content identifiers and, for each content identifier, a corresponding server index (or information from which the server index may be obtained) indicating from which server 204 of a CDN 102 the content may be retrieved. A specific example of how the particular server 204 is determined via a consistent hash function is discussed below in further detail. Regardless of the method used to identify a server 204 of CDN-A 102, for purposes of the current example, it is assumed that the rendezvous system 202 determines that Server A 204 is the preferred server from which the content is to be retrieved and, as a result, obtains a corresponding server identifier for Server A 204.

After identifying a server, the rendezvous system 202 may return a domain name to the CMS 104 corresponding to the identified server. The CMS 124 may then return the domain name to the client device 104. In one specific example, the domain name may be of the form "<server>.<location>.<domain>", where <server> is a server identifier corresponding to the identified server (e.g., "serverA"), <location> is an identifier of the geographic location associated with the client device 104 and the CDN portion containing the server (e.g. "Denver"), and <domain> is a domain (e.g., "foo.com") associated with the DNS architecture 154 for resolving domain names generated by the rendezvous system 202. So, for example, a domain name of "serverA.Denver.foo.com" may be returned to the client device 104 from the CMS 124 as received from the rendezvous system 202 if the content is to be retrieved from Server A 204 of CDN-A 102.

After receiving the domain name from the CMS 124, the client device 104 may provide the domain name to a DNS resolver 152 in a DNS request, as described above. In some instances, the DNS resolver 152 may forward the DNS request to the DNS architecture 154 to obtain a corresponding IP address for server A 204. To resolve the DNS request, the DNS architecture 154 may communicate or access a rendezvous lookup table 214 including entries that correspond location, server identifier, and a particular IP address of a server of the CDN-A 102. The information included in the rendezvous lookup table 214 may be provided to the DNS architecture 154 by the rendezvous system 202 to correspond server identifiers with IP addresses of servers of the CDN 102. In this manner, the rendezvous system 202 may control which servers 204-208 of the CDN 102 are associated with the particular server identifiers provided by the rendezvous system 202 in response to a query from the CMS 124. The particular IP address for the server identified by the server identifier is then provided to the client device 104. In some instances, the DNS architecture 154 may provide a plurality of IP addresses of multiple servers of the CDN 102 with some indication of a preference for one server over another. For example, the DNS architecture 154 may provide a first IP address for server A 204, a second IP address for server B 206, a weighted value of x associated with the first IP address, and a weighted value of y associated with the second IP address, with x being a larger weighted value than y. The second IP address may indicate a backup server for requesting content if the first server associated with the first IP address cannot provide the content. The weighted values may provide further instructions to the client device 104 for accessing servers 204-208 of the CDN 102.

The client device 104 may then initiate a session (e.g., a hypertext terminal protocol (http) or similar session) with server A 204 to retrieve the requested content. In cases where the content is cached or otherwise stored at server A 204, server A may begin transmitting the content to the client device 104. If, on the other hand, server A 204 does not currently store the requested content, server A may retrieve and cache the content consistent with the particular content distribution and caching techniques implemented in the CDN 102 as described above.

Through the network environment 200 of FIG. 2, the client device 104 may be pushed to request content from a particular server 204 of the CDN 102. As content from the CDN 102 is cached at the servers 204-208 upon one or more requests for the content, directing client devices 104 to particular servers may improve the caching function of the CDN. More particularly, client devices 104 requesting the same content may be directed to the same servers such that the content may be cached at a few select servers, freeing up caching space on other servers of the CDN 102 to cache other content. A repeatable process for directing client devices 104 requesting the same content to the same server or servers may therefore improve the efficiency of the CDN 102 to provide said content to the client devices 104.

Figure 3:
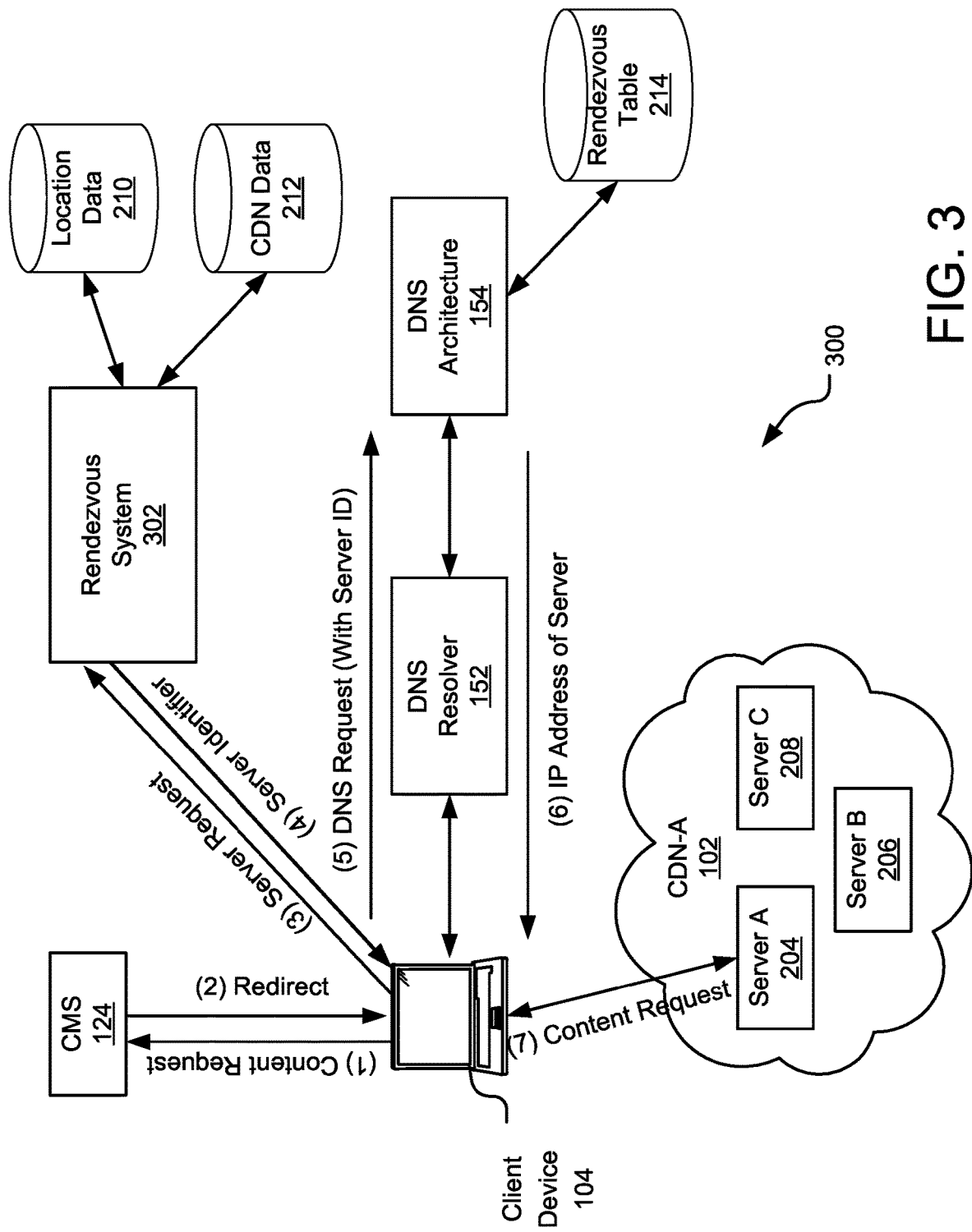
FIG. 3 is a second example network environment including a second rendezvous system for processing requests for content available through a CDN.

FIG. 3 is a second example network environment 300 including a second rendezvous system 302 for processing requests for content available through a CDN 102. Similar to the network environment 200 of FIG. 2, the network environment 300 of FIG. 3 includes a client device 140 in communication with a CMS 124. The CMS 124 is configured to present and/or manage requests for content received from the client device 140. In this implementation, the CMS 124 again determines which CDN of multiple CDNs for which the requested content may be provided to the client device 140. For example, CMS 124 may select CDN-A 102 from a plurality of available CDNs to provide the content. In response to the request for content received at the CMS 124, the CMS may return to the client device 104 a redirect instruction to access the rendezvous system 302 of the environment 300. In other words, rather than the CMS 124 accessing the rendezvous system 302 to obtain the server identifier of the CDN 102 as above, the client device 104 may be redirected, based on information provided by the CMS 124, to the rendezvous system 302. In one instance, the redirect instructions may include a content identifier, a CDN identifier of the selected CDN, an IP address or other network address of the rendezvous system 302, a geographic location identifier of an estimated location of the client device 104, and/or other information for redirecting the client device 104.

In response to receiving the redirect instruction from the CMS 124, the client device 104 may transmit a server identification request to the rendezvous system 302 to identify the particular server within the CDN 102 from which the requested content may be accessed. In one example, the server identification request, similar to above, may include an identifier of the requested content and a geographic location indicator of the client device 104. The rendezvous system 302 then generates and returns a domain name to the client device 104. As previously discussed, the domain name may include, among other things, identifiers corresponding to a specific server 204 of a specific CDN 102 from which the requested content may be retrieved and may be generated by the rendezvous system 302 based on one or more of location data 210 and/or CDN data 212, as previously discussed above. In addition, the rendezvous system 302 may execute a hashing function or other similar algorithm to select the server 204 of the CDN 102 for providing the requested content.

The client device 104 may then submit the received domain name to a DNS resolver 152 and/or the DNS architecture 154 to resolve the domain name to an IP address of the server 204 from which the content may be retrieved, as described. The client device 104 may then connect to the server 204 and request the content.

In still another instance, one or more of the functions of the rendezvous system 202, 302 may be performed by the CMS 124. For example, the rendezvous system 302 may provide the hashing function executed to determine the particular server 204 of the available servers 204-208 of the CDN 102. The CMS 124 may then execute the hashing function to obtain the server identifier for the selected server and provide the server identifier accordingly. In addition, the CMS 124 may be given access to location database 210 and/or CDN database 212 to determine the available servers of the CDN 102 for providing the content to the client device 104, based on the content identifier and/or the geographic location identifier of the client device 104 received at the CMS 124.

Figure 4:
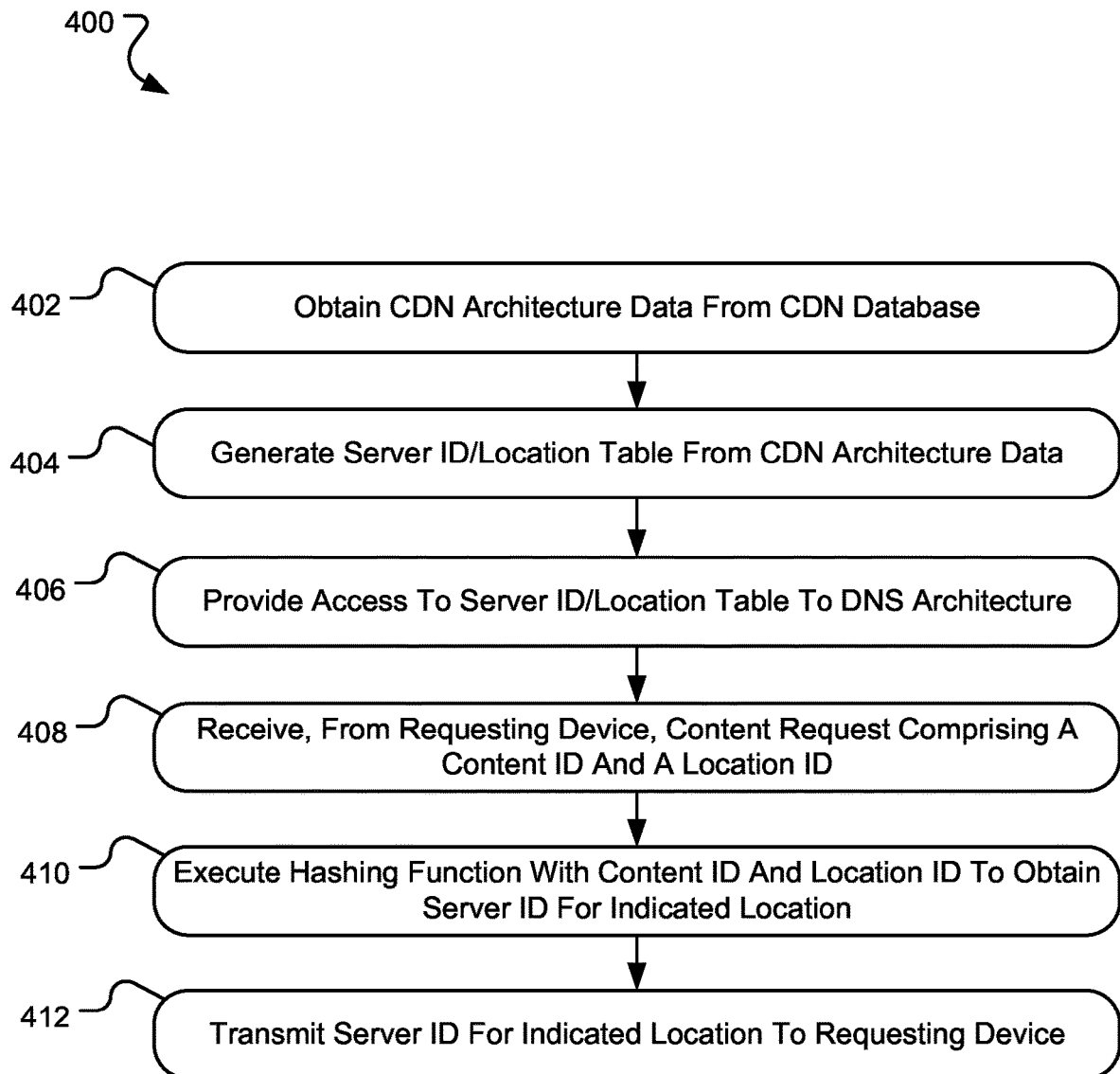
FIG. 4 is a flow chart illustrating a method for processing requests for content available through a CDN.

FIG. 4 is a flow chart illustrating a method 400 for processing requests for content available through a CDN 102. In one instance, the operations of the method 400 may be executed by the rendezvous system 202, 302 of the network environment 200, 300 described above. In other instances, other systems or devices of the environments discussed above may execute one or more of the operations.

For example, CMS 124, DNS architecture 154, and/or the client device 104 may the operations. The operations may also be executed through a software program, one or more hardware components, or a combination of software programs and hardware components.

Beginning in operation 402, the rendezvous system 202 may obtain CDN architecture data from the CDN database 212. In particular, the rendezvous system 202 may determine one or more servers available in a particular location serviced by the CDN-A 102. For example, the rendezvous system 202 may determine that servers A-C 204-208 of CDN-A 102 may be available to provide content to requesting devices within the a particular geographic location, such as a metro area. Other locations or metro areas may be serviced by the CDN-A 102 and may include more or fewer content servers 204-208. For example, a large metro area may include 20 servers to provide content to requesting devices within the metro, while a smaller metro area may include fewer than 5 servers to provide content servers for devices within the small metro. In general, more servers may be available to provide content in geographic areas with more potential requesting devices or users.

In operation 404, the rendezvous system 202 may generate a server identification and location table from the CDN architecture data associated with a particular location or metro area of the CDN 102. Using the example illustrated in FIG. 2, the CDN-A 102 may include three servers (namely server A-C 204-208) for providing content to requesting devices in a particular geographic area. The geographic location and the three servers 204-208 available to provide content may be obtained from the CDN database 212 by the rendezvous system 202 and a table associating the three servers 204-208 and the geographic location may be generated. In a similar manner, other geographic locations and the identification of a number of servers of the location may also be included in the table by the rendezvous system 202. In one particular example, the servers 204-208 available in a particular location may be noted in the table by a server ID value that acts as a placeholder value for the server in relation to the number of servers available in the location. For example, servers 204-208 of the CDN 102 may be included in the table with server IDs as discussed above, such as "serverA.Denver.foo.com". An additional entry may also be included in the server ID/location table or may be included in a separate table. The additional entry may associate the generated server IDs of the table with a network address or other network identifier, such as an IP address associated with each of the noted server IDs. In some instances, the IP address for one or more servers of the table may be updated in the table as available servers of the CDN 102 are brought online or removed. For example, an IP address of a redundant server may be included in the table upon a failure of a server of the CDN 102 to redirect traffic from the failed server to the redundant server.

In operation 406, the rendezvous system 202 may provide, to the DNS architecture 154, access to the generated server ID/location table or to the information included in the table. In one instance, the rendezvous system 202 may maintain the rendezvous table in a database 214 and notify the DNS architecture 154 of the presence of the table in the database 214. In another example, the rendezvous system 202 may provide the table to the DNS architecture 154, which may store the table in the rendezvous table database 214. Updates to the table may occur in a similar manner in which the rendezvous system 202 may provide the updates to the DNS architecture 154 that may update the rendezvous table database 214 accordingly. Regardless of the database used, the DNS architecture 154 may be provided access to the information contained in the rendezvous table 214 such that the DNS architecture 154 may respond with an IP address of a server 204 of the CDN 102 based on a DNS request provided by a requesting device 104. The DNS request may include a server ID as noted above from which the DNS architecture 154 may access a corresponding IP address for the target server of the CDN 102.

In operation 408, the rendezvous system 202 may receive, from a requesting device such as the CMS 124 or client device 104, a request for content that includes an identifier of the requested content and an identifier of a location of the client device 104. As described above, the CMS 124 may provide the content request based on information provided to the CMS 124 from the client device 104. Alternatively, the client device 104 may be redirected to provide the rendezvous system 202 with the content request. The content identifier may be any alphanumeric or other value associated with the requested content and the location identifier may be an estimated location of a destination device for receiving the content. In operation 410, the rendezvous system 202 may execute a hashing function using the content identifier and/or the location identifier to generate a server ID from which the content may be provided to the client device 104. For example, the rendezvous system 202 may utilize CDN data 212 to determine the number of servers available for the particular location identified in the location identifier. The number of servers for the particular location may be a first input to the hashing function. The hashing function may also use the content identifier to generate a server ID from the number of available servers for the location of the client device 104.

In one specific example, the rendezvous system 202 may use a distributed consistent hashing scheme. Consistent hashing is based on mapping each object (here, either servers of the CDN 102 or content available through the CDN) to a location on the edge of a circle or ring, where each location on the ring corresponds to a value in a hash key space defined by the range of outcomes of a hashing function. For example, in certain implementations, an n-bit hashing function may generate a hash ranging from 0 to $2^n-1$ and, as a result, the corresponding hash key space may include $2^n$ locations. The location of a given object in the hash key space is then determined by hashing a key associated with the object. So, for example, a key for a given piece of content may be the content itself or other data associated with the content. Similarly, a key for a server of the CDN may be an identifier associated with the server or some other data associated with the server, such as the server's IP address or name.

To determine from which server a given piece of content is to be retrieved, the location of the content within the hash key space is identified. The content is then assigned to the next server in a particular direction (e.g., clockwise or counter-clockwise) about the circle. As a result, a given server provides all content located between itself and the previous server on the circle opposite the direction of travel used in the consistent hash. The foregoing process of assigning content to a server be expressed as:

$$\text{serverID} = \text{hash}(\text{contentkey}) \% N$$

where N is the total number of servers for the CDN, hash ( ) is a hashing function, contentkey is a key associated with the content (which may be but is not limited to the content itself) and serverID is a numerical identifier ranging from 0 to N assigned to a server of the CDN. In response to a server being added or removed from the CDN (e.g., a change in the value of N in the above formula), the serverID for each piece of content may be recalculated and the content may be redistributed or reassigned within the CDN according to the new mapping. Accordingly, if a server becomes unavailable (for example, because the server is disconnected, fails, or is removed from the CND) then the points it maps to will be removed and remapped to other servers. Similarly, adding a new server between two servers would take on at least a portion of the points mapped to the next server.

As noted, each piece of available content from the CDN 102 for an area may be associated with a particular serverID corresponding to the server on which the content is stored. Such information may be stored, for example, as part of the CDN content data 212 accessible by the rendezvous system 202. In other implementations, other data from which the server may be identified may be stored and accessible by the rendezvous system 202 such that the rendezvous system may dynamically identify the particular server from which content may be retrieved. The rendezvous system 202 may then calculate a serverID based on the number of servers identified in the CDN data 212 for the particular location of the client device 104.

In implementations of the present disclosure, identification of a particular server from which to obtain content may be deterministic. In other words, requests for the same content and including location identifiers that are resolved to the same server 204 always result in the requesting device being directed to the same server 204. In this manner, content may be cached at determined servers, based on the requested content, to reduce unnecessary caching of content across multiple servers within an area serviced by the CDN 102. This may open up caching space for other content to be cached, improving the efficiency of the caching scheme of the CDN 102.

In operation 412, the rendezvous system 202 may transmit the determined server ID to the requesting device from which the content request was received. For example, the rendezvous system 202 may transmit the server ID to the CMS 124 or the client device 104. The server ID may be, in some instances, included in a domain name, such as "serverA.Denver.foo.com". As described above, this domain name may be used by the client device 104 as a portion of a DNS request to the DNS architecture 154 to obtain an IP address or other network address for the selected server 204 of the CDN 102 for providing the content.

In certain implementations of the present disclosure, the client device 104 may receive multiple domain names and/or IP addresses in response to a content request. For example, in one implementation, the rendezvous system 202 may provide a first domain name corresponding to a primary server for retrieving requested content and one or more second domain names corresponding to a backup server. In implementations in which content is distributed via a consistent hashing scheme, for example, the backup server may be the next server in the consistent hash. Multiple IP addresses may also be provided to the client device 104 when resolving a domain name received from the rendezvous system 202. In such cases, the DNS architecture 154 may be configured to provide multiple IP addresses in response to receiving a domain name identifying a particular server of a CDN 102.

Figure 5:
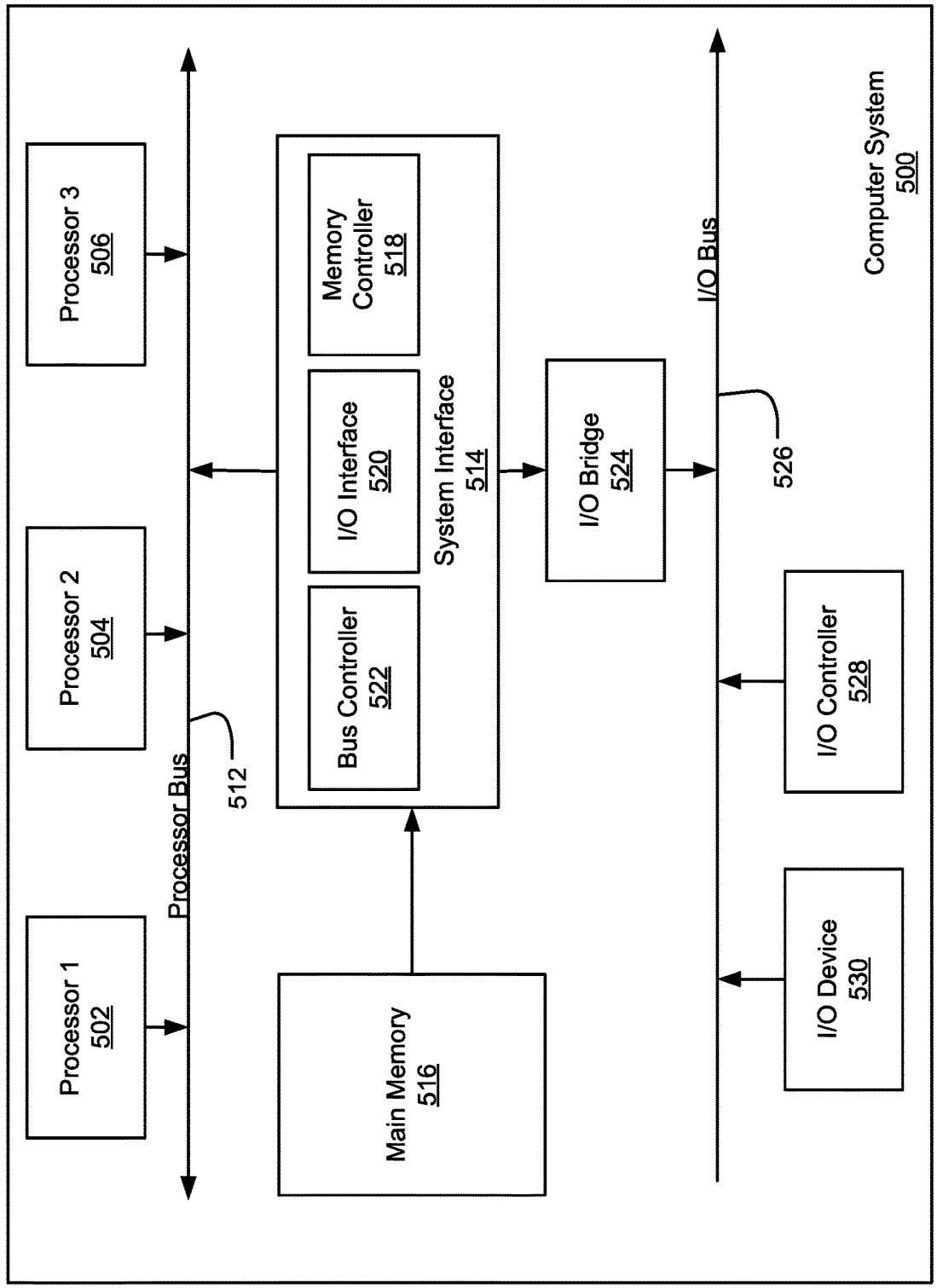
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the network disclosed above. In particular, the computing device of FIG. 5 is one embodiment of the server or other networking component that performs one of more of the operations described above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 518 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A method of processing content requests comprising:
receiving, at a rendezvous system, a request for content from a network, the content request including each of a content identifier associated with a content file and a location identifier associated with the geographic location;
obtaining, based on the location identifier and the content identifier, a server identifier corresponding to a content server of a plurality of content servers of the network in the geographic location; and
transmitting, to a requesting device, a domain name comprising the server identifier, wherein a domain name system (DNS) resolver, upon receiving the server identifier, returns, based on a server identifier look-up table, a network address of the content server to the requesting device for caching the content at the content server,
wherein obtaining the server identifier comprises executing a hashing function, with the content identifier as an input variable, the output of the hashing function corresponding to the server identifier of the content server.

2. The method of claim 1 wherein each of the plurality of servers is geographically proximate to the geographic location indicated by the location identifier.

3. The method of claim 1 wherein the content request is received from a content management system (CMS) and transmitting the domain name comprises transmitting the domain name to the CMS.

4. The method of claim 3 wherein the location identifier is inserted into the content request by the CMS, the location identifier associated with a location of a client computing device to which the content is to be served.

5. The method of claim 1 wherein the content request is received from a client computing device and transmitting the domain name comprises transmitting the domain name to the client computing device.

6. The method of claim 1, further comprising:
obtaining an estimated location of a client computing device to which the content is to be provided by comparing the location identifier to a location database.

7. The method of claim 1, further comprising:
storing, upon obtaining the server identifier, the content at the content server of the plurality of content servers of the network.

8. The method of claim 1 wherein the content server is a first content server, the method further comprising, in response to receiving the request for content, returning a second IP address corresponding to a second content server of the network, wherein the second server of the network is a backup content server for serving the content when the first content server is unavailable.

9. A system for orchestrating content from a network, the system comprising:
a rendezvous device caused to:
obtain, based on a location identifier associated with a geographic location of a content requesting device and a content identifier associated with a content file included in a request for content, a server identifier corresponding to a content server of a plurality of content servers of the network in the geographic location; and
return, in response to the request for content, a domain name comprising the server identifier, wherein a domain name system (DNS) resolver, upon receiving the server identifier, returns, based on a server identifier look-up table, a network address of the content server to the requesting device for caching the content at the content server,
wherein the rendezvous device is further caused to execute a hashing function, with the content identifier as an input variable, to identify the content server from the plurality of content servers, each of the plurality of content servers being assigned a respective server identifier.

10. The system of claim 9, further comprising:
a location database in communication with the rendezvous device and storing network architecture information of the network, the rendezvous device further caused to identify the plurality of content servers of the network based on the location identifier, wherein each of the plurality of content servers is geographically proximate to the geographic location.

11. The system of claim 10, further comprising:
a network architecture database in communication with the rendezvous device and storing content availability of the plurality of content servers of the network.

12. The system of claim 9 wherein the hashing function returns the server identifier corresponding to the identified content server from the plurality of content servers.

13. The system of claim 9 wherein the domain name further comprises a location code associated with the geographic location of the content server and a domain name root address.

14. The system of claim 9 wherein the rendezvous system further caused to:
store, upon obtaining the server identifier, the content at the content server of the plurality of content servers of the network.

15. The system of claim 9 wherein the rendezvous device comprises a communication port in communication with a content management system (CMS), wherein the content request is received from the CMS and returning the domain name comprises transmitting the domain name to the CMS.

16. A networking device comprising:
one or more processors; and
a non-transitory storage device configured to store one or more programs, wherein the one or more programs, when executed by the one or more processors, cause the one or more processors to:
- obtain, based on a location identifier associated with a geographic location of a content requesting device and a content identifier associated with a content file included in a request for content, a server identifier corresponding to a content server of a plurality of content servers of a network in the geographic location;
- return, in response to the request for content, a domain name comprising a server identifier, wherein a domain name system (DNS) resolver, upon receiving the server identifier, returns, based on a server identifier look-up table, a network address of the content server to the requesting device for caching the content at the content server; and
- execute a hashing function, with the content identifier as an input variable, to identify the content server from the plurality of content servers, each of the plurality of content servers being assigned a respective server identifier.

17. The networking device of claim 16 wherein the request for content is received from a content management system (CMS) and returning the domain name comprises transmitting the domain name to the CMS.

18. The networking device of claim 16 wherein the request for content is received from a client computing device and transmitting the domain name comprises transmitting the domain name to the client computing device.

* * * * *